United States Patent [19]
Kuwana et al.

[11] Patent Number: 5,141,297
[45] Date of Patent: Aug. 25, 1992

[54] ANTI-LOCK BRAKE CIRCUIT WITH A PIEZO HYDRAULIC PUMP AND CHANGEOVER VALVE

[75] Inventors: Kazutaka Kuwana, Toyota; Takashi Nagashima, Nukata; Masahiro Inden, Toyoake; Yasuo Kuwabara; Jun Funakawa, both of Nagoya; Akemi Takada, Obu, all of Japan; Tetsuya Morita, Krailling, Fed. Rep. of Germany

[73] Assignee: Aisin Seiki Kabushiki Kaisha, Kariya, Japan

[21] Appl. No.: 687,005

[22] Filed: Apr. 18, 1991

[30] Foreign Application Priority Data

Apr. 18, 1990 [JP] Japan .................... 2-102467

[51] Int. Cl.⁵ .............................................. B60T 8/48
[52] U.S. Cl. ...................... 303/116 PC; 303/116 R; 303/10; 310/328
[58] Field of Search ............. 303/116 PC, 116 R, 10, 303/DIG. 6, 113 AP, 9.61, 9.75, 9.62, 61; 310/328

[56] References Cited

U.S. PATENT DOCUMENTS

| | | | |
|---|---|---|---|
| 3,501,099 | 3/1970 | Benson | 310/328 X |
| 3,598,506 | 8/1971 | O'Neill | 310/328 X |
| 4,738,493 | 4/1988 | Inagaki et al. | 310/328 X |
| 4,989,924 | 2/1991 | Toda et al. | 303/61 X |
| 5,021,957 | 6/1991 | Yoshino et al. | 303/95 X |

FOREIGN PATENT DOCUMENTS

| | | | |
|---|---|---|---|
| 61-160343 | 7/1986 | Japan . | |
| 0103755 | 5/1988 | Japan | 303/116 R |

Primary Examiner—Matthew C. Graham
Assistant Examiner—Josie A. Ballato
Attorney, Agent, or Firm—Burns, Doane, Swecker & Mathis

[57] ABSTRACT

A brake control device for vehicles includes a master cylinder, a plurality of wheel cylinders, and an anti-lock control apparatus disposed between the master cylinder and the wheel cylinders of at least one hydraulic circuit. The anti-lock control apparatus includes a hydraulic pump, a reservoir and a changeover device which is selectively changed over at least between a first condition which permits an increase in the hydraulic pressure of the wheel cylinders of at least one hydraulic circuit and a second condition which permits an decrease in the hydraulic pressure of the wheel cylinders of at least one hydraulic circuit in response to the locking condition of the road wheels. The hydraulic pump includes a housing, a slidable piston device for defining a pump chamber which is communicated with the reservoir and the changeover device at a side of one end thereof in the housing, an inlet check valve disposed between the pump chamber and the reservoir for permitting fluid communication from the reservoir to the pump chamber and for interrupting fluid communication from the pump chamber to the reservoir, an outlet check valve disposed between the pump chamber and the changeover device for permitting fluid communication from the pump chamber to the changeover device and for interrupting fluid communication from the changeover device to the pump chamber, and a piezo element for reciprocating the piston device disposed at the other end of the piston device.

6 Claims, 2 Drawing Sheets

ANTI-LOCK BRAKE CIRCUIT WITH A PIEZO HYDRAULIC PUMP AND CHANGEOVER VALVE

FIELD OF THE INVENTION

The present invention relates to a brake control device for use in a hydraulic brake system in vehicles, and more particularly to a brake control device for use in a hydraulic brake system in vehicles that includes an anti-lock control apparatus disposed in at least one hydraulic circuit that communicates the master cylinder with the wheel cylinders.

BACKGROUND OF THE INVENTION

One type of conventional brake control device is disclosed, for example, in Japanese Patent Application Laid-Open Publication No. 61-160343 published on Jul. 21, 1986. This conventional brake control device includes a master cylinder for generating a hydraulic braking pressure in response to depression of a brake pedal, hydraulical pressure chambers provided in the master cylinder, a plurality of wheel cylinders communicating with the hydraulic pressure chambers via a plurality of hydraulic circuits, and an anti-lock control apparatus interposed in the hydraulic circuits. The anti-lock control apparatus includes a hydraulic pump driven by an electric motor, a reservoir and a changeover feature for selectively changing at least between a first condition in which an increase in the pressure of each wheel cylinder is permitted and a second condition in which a decrease in the pressure of each wheel cylinder is permitted in response to the locking condition of the road wheels.

In this conventional brake control device, however, since the hydraulic pump is driven by the electric motor, the size of the hydraulic pump may have to be increased and the size of the brake control device may also have to be increased. As a result, this conventional brake control device is restricted by space when the brake control device is equipped on vehicles. Furthermore, the operational sound of the electric motor caused by its rotation and operation is transmitted into the interior of the vehicle as undesirable noise.

SUMMARY OF THE INVENTION

It is, therefore, an object of the present invention to provide an improved brake control device for vehicles which overcomes the above drawbacks.

It is another object of the present invention to reduce the size of the brake control device for vehicles of this kind.

It is a further object of the present invention to reduce the noise and improve the silence characteristics of the brake control device of this kind.

In order to achieve these objects, there is provided a brake control device for vehicles which includes a master cylinder for generating a hydraulic braking pressure in response to the depression of the brake pedal, a plurality of wheel cylinders in communication with the master cylinder via a plurality of hydraulic circuits, and an anti-lock control apparatus disposed between the master cylinder and the wheel cylinders of at least one hydraulic circuit. The anti-lock control apparatus includes a hydraulic pump, a reservoir and a changeover arrangement for selectively changing at least between a first condition which permits an increase in the hydraulic pressure of the wheel cylinders of at least one hydraulic circuit and a second condition which permits a decrease in the hydraulic pressure of the wheel cylinders of at least one hydraulic circuit in response to the locking condition of the road wheels. The hydraulic pump includes a housing and a piston for defining a pump chamber which is communicated with the reservoir and the changeover arrangement at one end thereof in the housing and which is slidably fitted in the housing so as to be able to reciprocate. The hydraulic pump also includes an inlet check valve disposed between the pump chamber and the reservoir for permitting fluid communication from the reservoir to the pump chamber and for interrupting fluid communication from the pump chamber to the reservoir, an outlet check valve disposed between the pump chamber and the changeover arrangement for permitting fluid communication from the pump chamber to the changeover arrangement and for interrupting fluid communication from the changeover arrangement to the pump chamber, and a piezo element disposed at the other end of the piston for expanding and contracting in response to the application of an oscillating voltage so as to reciprocate the piston.

BRIEF DESCRIPTION OF THE DRAWINGS

Additional objects and advantages of the present invention will become more apparent from the following detailed description of a preferred embodiment thereof when considered with reference to the attached drawings, in which.

DETAILED DESCRIPTION OF THE PREFERRED EMBODIMENTS

A brake control device for vehicles constructed in accordance with an embodiment of the present invention will be described with reference to the drawings.

Figure 1:
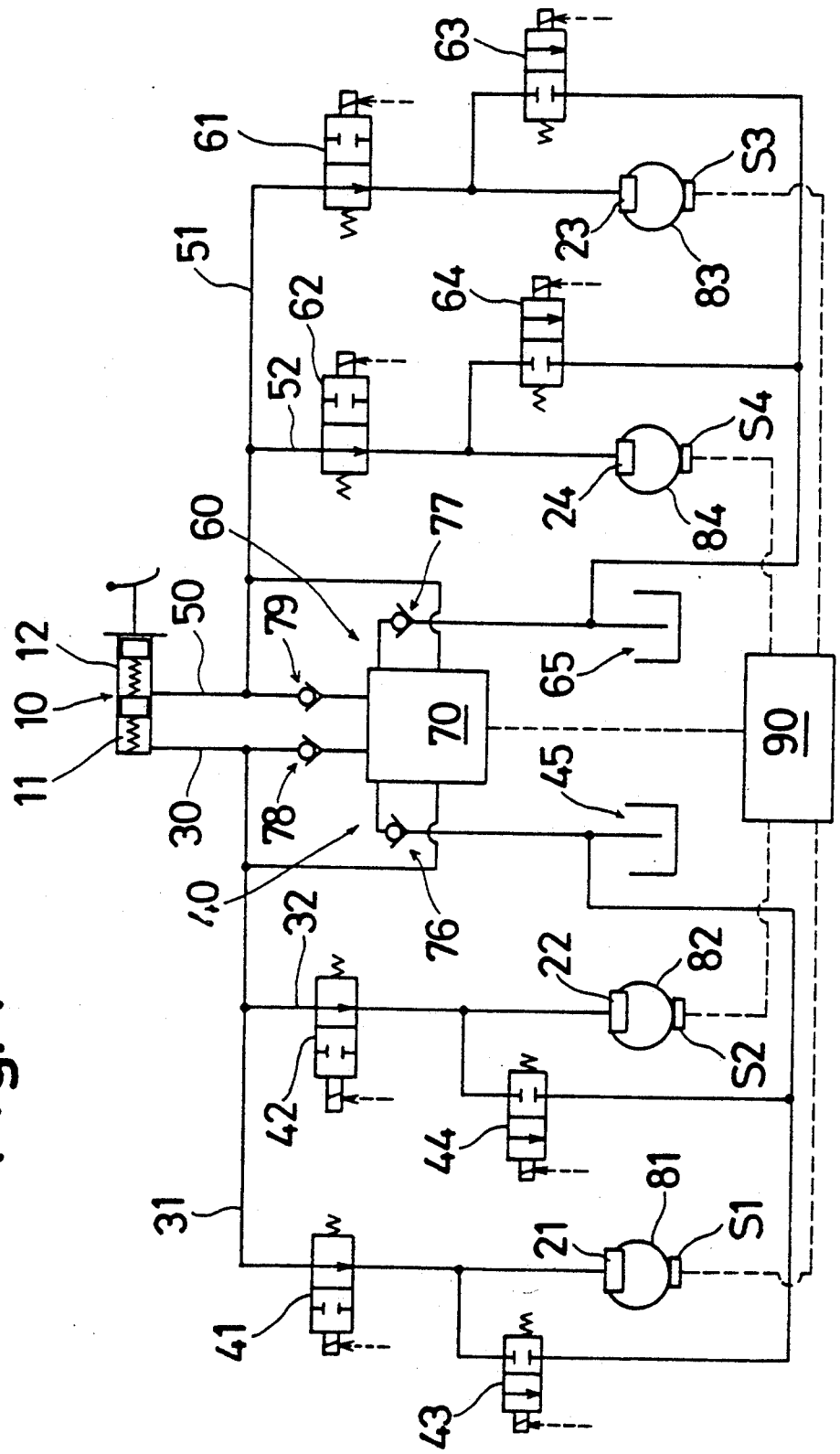
FIG. 1 is a schematic illustration of an embodiment of a brake control device for vehicles in accordance with the present invention.

Referring to a FIG. 1, there is schematically illustrated a brake control device for vehicles which includes a tandem master cylinder 10 (hereinafter, the tandem master cylinder will be referred to simply as a master cylinder), a plurality of wheel cylinders 21, 22, 23, 24 and an anti-lock control apparatus 40, 60. The master cylinder 10 is provided with a first hydraulic pressure chamber 11 and a second hydraulic pressure chamber 12. The master cylinder 10 generates a hydraulic braking pressure in response to depression of a brake pedal. The first hydraulic pressure chamber 11 of the master cylinder 10 is communicated with a wheel cylinder 21 of a left front road wheel 81 and a wheel cylinder 22 of a right rear road wheel 82 via a hydraulic circuit 30. The anti-lock control apparatus 40 is disposed in the hydraulic circuit 30. On the other hand, the second hydraulic pressure chamber 12 of the master cylinder 10 is communicated with a wheel cylinder 23 of a right front road wheel 83 and a wheel cylinder 24 of a left rear road wheel 84 via a hydraulic circuit 50. The anti-lock control apparatus 60 is disposed in the hydraulic circuit 50. In this embodiment, the anti-lock apparatus 40, 60 are of the returntype.

The hydraulic circuit 30 is defined by a hydraulic passage 31 which communicates the first hydraulic pressure chamber 11 of the master cylinder 10 with the wheel cylinder 21 and a hydraulic passage 32 which is divided from the hydraulic passage 31 and which is communicated with the wheel cylinder 22. The hydraulic circuit 50 is defined by a hydraulic passage 51 which communicates the second hydraulic pressure chamber 12 of the master cylinder 10 with the wheel cylinder 23 and a hydraulic passage 52 which is divided from the hydraulic passage 51 and which is communicated with the wheel cylinder 24. Also, a well-known proportioning valve (not shown) is disposed in the hydraulic passages 32, 52.

The anti-lock apparatus 40 includes several supply changeover valves 41, 42, several discharge changeover valves 43, 44, a reservoir 45, and a hydraulic pump 70. The supply changeover valves 41, 42 are disposed in the hydraulic passages 31, 32, respectively. The discharge changeover valves 43, 44 are disposed in the hydraulic passages that communicate the reservoir 45 with the hydraulic passages 31, 32 positioned between the wheel cylinders 21, 22 and the supply changeover valves 41, 42, respectively. The reservoir 45 and the hydraulic pump 70 are disposed with regard to the hydraulic passages 31, 32 in parallel, respectively.

The supply changeover valves 41, 42 and the discharge changeover valves 43, 44 constitute a changeover means of the present invention. The supply changeover valves 41, 42 and the discharge changeover valves 43, 44 can be two port-two position solenoid operated directional control valves arranged to be energized in response to the electric control signal from an electric control device 90. The electric control device 90 calculates the slip ratios of the road wheels 81, 82 on the basis of the detection signals of wheel speed sensors S1, S2 which detect the rotational speeds of the road wheels 81, 82. The electric control device 90 controls the changeovers of the supply changeover valves 41, 42 and the discharge changeover valves 43, 44 so as to maintain the slip ratios of the road wheels 81, 82 within the appropriate bounds.

The supply changeover valves 41, 42 and the discharge changeover valves 43, 44 can be selectively placed in one of a first operating position and a second operating position. In a first operating position or a normal position (deenergized position) of these valves 41, 42, 43, 44, as shown in FIG. 1, the first hydraulic pressure chamber 11 of the master cylinder 10 is communicated with the wheel cylinders 21, 22 and the wheel cylinders 21, 22 are blocked from the reservoir 45. Therefore, the hydraulic pressure in the wheel cylinders 21, 22 is increased. In a second operating position or an energized position of these valves 41, 42, 43, 44, the wheel cylinders 21, 22 are blocked from the first hydraulic pressure chamber 11 of the master cylinder 10 and are communicated with the reservoir 45. Therefore, the operational fluid in the wheel cylinders 21, 22 is discharged to the reservoir 45 and the hydraulic pressure in the wheel cylinders 21, 22 is decreased. In the energized position of the supply changeover valves 41, 42, the wheel cylinders 21, 22 are blocked from the first hydraulic pressure chamber 11 of the master cylinder 10 and the reservoir 45, and the hydraulic pressure in the wheel cylinders 21, 22 is maintained.

On the other hand, the anti-lock apparatus 60 includes several supply changeover valves 61, 62, several discharge changeover valves 63, 64, a reservoir 65, and the hydraulic pump 70. The supply changeover valves 61, 62 are disposed in the hydraulic passages 51, 52, respectively. The discharge changeover valves 63, 64 are disposed in the hydraulic passages that communicate the reservoir 65 with the hydraulic passages 51, 52 positioned between the wheel cylinders 23, 24 and the supply changeover valves 61, 62, respectively. The reservoir 65 and the hydraulic pump 70 are disposed with regard to the hydraulic passages 51, 52 in parallel, respectively.

The supply changeover valves 61, 62 and the discharge changeover valves 63, 64 constitute a changeover means of the present invention. The supply changeover valves 61, 62 and the discharge changeover valves 63, 64 can be two port-two position solenoid operated directional control valves arranged to be energized in response to the electric control signal from the electric control device 90. The electric control device 90 calculates the slip ratios of the road wheels 83, 84 on the basis of detection signals from wheel speed sensors S3, S4 which detect the rotational speeds of the road wheels 83, 84. The electric control device 90 controls the changeovers of the supply changeover valves 61, 62 and the discharge changeover valves 63, 64 so as to maintain the slip ratios of the road wheels 83, 84 within the appropriate bounds.

The supply changeover valves 61, 62 and the discharge changeover valves 63, 64 can be selectively placed in one of a first operating position and a second operating position. In a first operating position or a normal position (deenergized position) of these valves 61, 62, 63, 63, as shown in FIG. 1, the second hydraulic pressure chamber 12 of the master cylinder 10 is communicated with the wheel cylinders 23, 24, and the wheel cylinders 23, 24 are blocked from the reservoir 65. Therefore, the hydraulic pressure in the wheel cylinders 23, 24 is increased. In a second operating position or an energized position of these valves 61, 62, 63, 64, the wheel cylinders 23, 24 are blocked from the second hydraulic pressure chamber 12 of the master cylinder 10 and are communicated with the reservoir 65. Therefore, the operational fluid in the wheel cylinders 23, 24 is discharged to the reservoir 65 and the hydraulic pressure in the wheel cylinders 23, 24 is decreased. In the energized position of the supply changeover valves 61, 61, the wheel cylinders 23, 24 are blocked from the second hydraulic pressure chamber 12 of the master cylinder 10 and the reservoir 65 and the hydraulic pressures in the wheel cylinders 23, 24 are maintained.

The supply changeover valves 41, 42, 61, 62 and the discharge changeover valves 43, 44, 63, 64 could be defined by three port-two position solenoid operated directional control valves or three port-three position solenoid operated directional control valves instead of the two port-two position solenoid operated directional control valves noted above. In such a case, it is possible to reduce the number of changeover valves.

Figure 2:
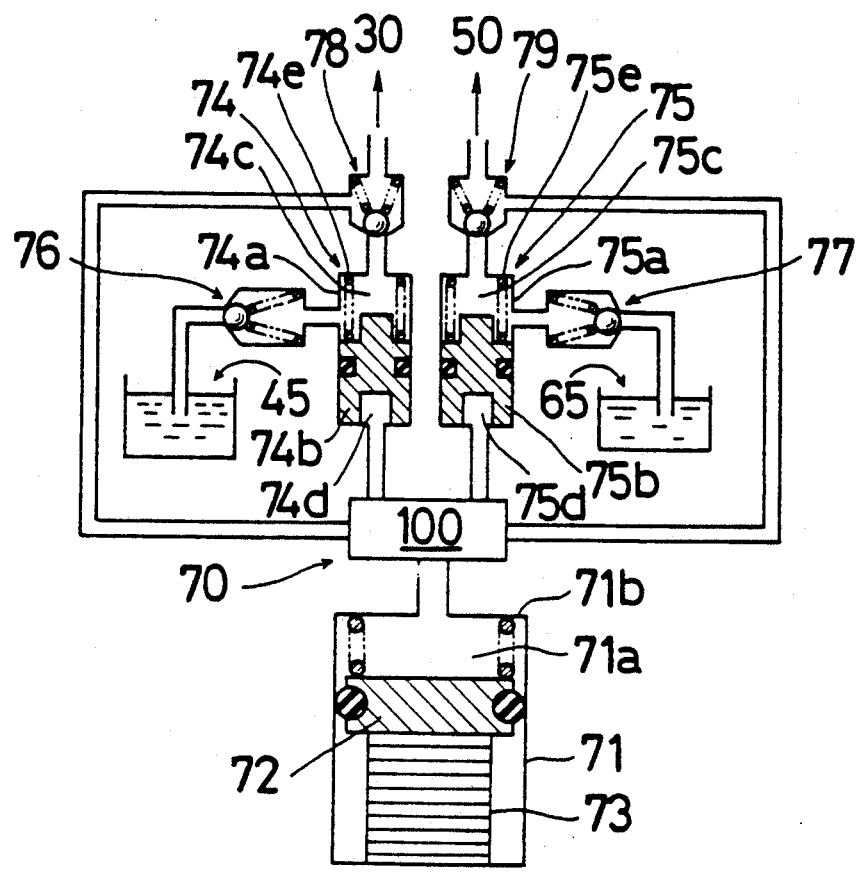
FIG. 2 is a cross-sectional view of an embodiment of a hydraulic pump of a brake control device for vehicles in accordance with the present invention.

In the disclosed embodiment, as shown in FIG. 2, the hydraulic pump 70 is defined by a body 71, an operational piston 72 slidably fitted in a fluid-tight manner within the body 71 and defining a pressure chamber 71a on one side thereof which can be increased and decreased in volume, and a piezo element 73 disposed at an opposite side of the operational piston 72. The piezo element 73 can be expanded and contracted by having an oscillating voltage signal applied thereto from the electric control device 90 so as to reciprocatingly slide the operational piston 72. The hydraulic pump 70 also includes a pair of pump mechanisms 74, 75, a pair of inlet check valves 76, 77, a pair of outlet check valves 78, 79 and a changeover valve 100.

The pump mechanisms 74, 75 include cylinder members 74a, 75a, pistons 74b, 75b having a diameter smaller than the diameter of the operational piston 72, and springs 74e, 75e. The pistons 74b, 75b are fluid-tightly and slidably fitted in the respective cylinder members 74a, 75b so as to be able to reciprocate therein and thereby define pump chambers 74c, 75c and operation chambers 74d, 75d. The pump chamber 74c is communicated with the reservoir 45 and the hydraulic circuit 30 which is positioned between the first pressure chamber 11 and the supply changeover valves 41, 42. The pump chamber 75c is communicated with the reservoir 65 and the hydraulic circuit 50 which is positioned between the second pressure chamber 12 and the supply changeover valves 61, 62. The operation chambers 74d, 75d are communicated with the pressure chamber 71a. The springs 74e, 75e are interposed in the pump chambers 74c, 75c. The cylinder members 74a, 75a and the body 71 constitute a housing of the hydraulic pump in the present invention. Furthermore, the operational piston 72 and the pistons 74b, 75b constitute a piston means of the hydraulic pump in the present invention.

The inlet check valves 76, 77 are interposed between the pump chambers 74c, 75c and the reservoirs 45, 65, respectively. The inlet check valves 76, 77 permit fluid communication from the reservoirs 45, 65 to the pump chambers 74c, 75c and interrupt fluid communication from the pump chambers 74c, 75c to the reservoirs 45, 65, respectively.

The discharge or outlet check valves 78, 79 are interposed between the pump chambers 74c, 75c and the hydraulic circuits 30, 50, respectively. The discharge check valves 78, 79 permit fluid communication from the pump chambers 74c, 75c to the hydraulic circuits 30 50 and interrupt fluid communication from the hydraulic circuits 30, 50 to the pump chambers 74c, 75c, respectively.

Figure 3:
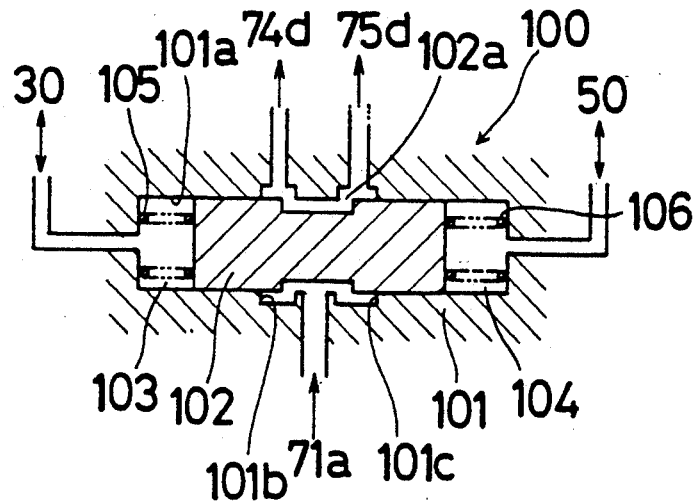
FIG. 3 is an enlarged cross-sectional view of the changeover valve shown in FIG. 2.

In the embodiment disclosed herein, as shown in FIG. 2 and FIG. 3, the changeover valve 100 is disposed between the pressure chamber 71a and the operation chambers 74d, 75d. The changeover valve 100 includes a housing 101 having an inner bore 101a into which the passages communicating with the operation chambers 74d, 75d are opened, a spool 102 slidably fitted in the inner bore 101a and defining balance chambers 103, 104 which are communicated with the hydraulic circuits 30, 50, respectively, and a pair of springs 105, 106 disposed in the balance chambers 103, 104 so as to oppose each other. A pair of circular grooves 101b, 101c are formed in the inner bore 101 and are communicated with the passages which communicate with the operation chambers 74d, 75d, respectively.

A passage which communicates with the pressure chamber 71a is opened between the circular grooves 101b, 101c. Furthermore, a circular groove 102a is formed on the outer periphery of the spool 102 so as to communicate the pressure chamber 71a with the operation chambers 74d, 75d when the spool 102 is in its neutral position as shown in FIG. 3. An operational fluid fills up a sealing space which extends from the pressure chamber 71a to the operation chambers 74b, 75d. Thus, when a pressure difference is generated between the hydraulic circuits 30, 50, the spool 102 slides, in response to the pressure difference, so as to communicate the pressure chamber 71a with the operation chamber which is positioned on the side of the hydraulic circuit of lower hydraulic pressure. Furthermore, when no pressure difference is generated between the hydraulic circuits 30, 50, the spool 102 is maintained in its neutral position. A spring 71b is interposed in the pressure chamber 71a so as to normally urge the operational piston 72.

In the above-described hydraulic pump 70, when the oscillating voltage signal is applied from the electric control device 90 to the piezo element 73, the piezo element 73 is expanded and contracted repeatedly by its reverse piezo effect. Thus, the operational piston 72 reciprocates repeatedly within the pressure chamber 71a and the volume of the operation chamber 74d (75d) which is in communication with the pressure chamber 71a by the changeover valve 100 is increased and decreased repeatedly via the operational fluid. Therefore, the piston 74b (75b) reciprocates repeatedly within its respective cylinder chamber 74a (75a) and the volume of the pump chamber 74c (75c) is correspondingly increased and decreased repeatedly. At this time, since the diameter of the pistons 74b, 75b is smaller than that of the operational piston 72, the repeated reciprocation of the pistons 74b, 75b are amplified. As a result, the operational fluid which is discharged to the reservoir 45 (65) during anti-lock control operation is sucked into the pump chamber 74c (75c) via the inlet check valve 76 (77) and is returned from the pump chamber 74c (75c) to the hydraulic circuit 30 (50) via the outlet check valve 78 (79).

The above-described embodiment of the brake control device for vehicles operates as follows. In the normal braking operation, each of the valves 41-44, 61-64 is placed in the deenergized position shown in FIG. 1. Therefore, the hydraulic braking pressure of the first hydraulic pressure chamber 11 of the master cylinder 10 is applied to the wheel cylinders 21, 22 via the supply changeover valves 41, 42 and the appropriate braking operation is imparted to the road wheels 8!, 82. At the same time, the hydraulic braking pressure of the second hydraulic pressure chamber 12 of the master cylinder 10 is applied to the wheel cylinders 23, 24 via the supply changeover valves 61, 62 and the appropriate braking operation is imparted to the road wheels 83, 84. In this normal braking operation, the operation of the hydraulic pump 70 is stopped and the discharge of the hydraulic braking pressure to the reservoirs 45, 65 is prevented by the outlet check valves 78, 79.

When the locking condition of the road wheels is detected in the braking operation and the anti-lock control is operated, the supply changeover valves 41, 42, 61, 62 and the discharge changeover valves 43, 44, 63, 64 are appropriately changed over between the two operating positions by the electric control device 90 in response to the locking condition of the road wheels 81-84, and the hydraulic pump 70 is operated by the electric control device 90. Therefore, the hydraulic pressure in the wheel cylinders 21-24 is decreased, maintained or increased as mentioned above and is appropriately regulated in response to the locking condition of the road wheels 81-84. Thus, the road wheels are prevented from locking s that the appropriate braking force is ensured.

In the anti-lock control operation, the oscillating voltage signal is applied from the electric control device 90 to the piezo element 73 and the piezo element 73 is expanded and contracted repeatedly by its reverse piezo effect. Consequently, the pistons 74b, 75b are repeatedly reciprocated via the operational fluid which fills the sealing spaces extending between the pressure chamber 71a and the operation chambers 74d, 75d. The operational fluid which is discharged to the reservoirs 45, 65 in the anti-lock control operation is returned to the hydraulic circuits 30, 50 by the pumping operation of the pump chambers 74c, 75c. For example, when the hydraulic pressure in the hydraulic circuit 30 is lower than the hydraulic pressure in the hydraulic circuit 50, the spool 102 of the changeover valve 100 will slide toward the balance chamber 103 and an edge portion of the circular groove 102a of the spool 102 will interrupt the fluid communication between the pressure chamber 71a and the operation chamber 75d. As a result, the pumping operation occurs only in the one pump chamber 74c.

As mentioned above, according to the embodiment disclosed herein, the expansion and contraction movement of the piezo element 73 by its reverse piezo effect is used as a power source for the pumping operation of the hydraulic pump 70 in the anti-lock control operation. Therefore, since it is possible to reduce the number of mechanical parts such as the rotational mechanism and so on, it is possible to decrease the operational sound and the vibration and it is also possible to improve the silence characteristics of the brake control device of this kind. Furthermore, it is possible to improve the response performance of the hydraulic pump by the piezo element.

Furthermore, according to the embodiment described herein, since there is no rotational mechanism such as an electric motor and there is no conversion mechanism which converts the rotational movement of the rotational mechanism to reciprocating movement, it is possible to minimize the size of the brake control device for vehicles of this kind and it is also possible to reduce the weight of the brake control device for vehicles of this kind. Additionally, since the hydraulic pump is operated at a high cycle by way of the piezo element 73, a large amount of the operational fluid can be supplied without increasing the size of the hydraulic pump.

Moreover, the pumping efficiency of the hydraulic pump is increased because it is possible to supply the pressure fluid only to the hydraulic circuit in which the consumption of the operational fluid is large by way of the changeover valve 100.

In the embodiment of the present invention described above, the anti-lock control apparatus used in the brake control device for vehicles is a return-type of anti-lock control apparatus. However, it is possible to employ other types of anti-lock control apparatus such as, for example, a volume increase-decrease-type of anti-lock control apparatus having a regulator valve which generates hydraulic braking power pressure in proportion to the hydraulic braking pressure in the pressure chamber of the master cylinder.

As mentioned above, according to the present invention, the expansion and contraction movement of the piezo element by its reverse piezo effect is used as a power source of the pumping operation of the hydraulic pump in the anti-lock control operation. Therefore, the silence characteristics of the brake control device of this kind is improved and the size of the brake control device for vehicles of this kind can be reduced and minimized.

The principles, preferred embodiment and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art and equivalents employed without departing from the spirit of the present invention. Accordingly, the foregoing detailed description should be considered exemplary in nature and not limited to the scope and spirit of the invention as set forth in appended claims.

What is claimed is:

1. A brake control device for vehicles comprising;
    a master cylinder for generating a hydraulic braking pressure in response to depression of a brake pedal, said master cylinder including two hydraulic pressure chambers;
    a plurality of wheel cylinders in communication with the hydraulic pressure chambers of the master cylinder via a plurality of hydraulic circuits;
    an anti-lock control apparatus disposed in the hydraulic circuits, said anti-lock control apparatus including a hydraulic pump, a reservoir and changeover means for selectively changing at least between a first condition which permits an increase in the hydraulic pressure of the wheel cylinders and a second condition which permits a decrease in the hydraulic pressure of the wheel cylinders in response to the locking condition of the road wheels; and
    the hydraulic pump including a body, an operational piston positioned in the body so as to define a pressure chamber at a side of one end thereof, a piezo element disposed at a side of an opposite end of the operational piston, said piezo element expanding and contracting through the application of an oscillating voltage so as to reciprocate the operational piston, a pair of pump mechanisms which include a pair of cylinders and a piston slidably fitted in each of the cylinders so as to define a pump chamber therein that communicates with the changeover means and the reservoir at one end thereof in the cylinder and so as to define an operation chamber communicating with the pressure chamber at another end thereof in the cylinder, inlet check valves disposed between the pump chambers and the reservoir for permitting fluid communication from the reservoir to the pump chambers and for interrupting fluid communication from the pump chambers to the reservoir, and outlet check valves disposed between the pump chambers and the changeover means for permitting fluid communication from the pump chambers to the changeover means and for interrupting fluid communication from the changeover means to the pump chambers.

2. A brake control device for vehicles as recited in claim 1, including elastic means for urging each of the pistons in the cylinders and the operational piston, said elastic means being interposed in the pump chambers and the pressure chamber, and wherein an operational fluid is disposed between the pressure chamber and the operation chamber.

3. A brake control device for vehicles as recited in claim 2, including a changeover valve which is interposed between the pressure chamber and the operation chambers for selectively changing over fluid communication between each of the operation chambers and the pressure chamber.

4. A brake control device for vehicles as recited in claim 3, wherein the changeover valve is changed over in response to a pressure differential between the hydraulic circuits.

5. A brake control device for vehicles comprising:
a first hydraulic circuit;
a second hydraulic circuit;
a master cylinder in communication with the first and second hydraulic circuits for generating hydraulic braking pressure in response to depression of a brake pedal;
a plurality of wheel cylinders in communication with the hydraulic circuits;
an anti-lock control apparatus disposed between the master cylinder and the wheel cylinders of at least one hydraulic circuit, said anti-lock control apparatus including two reservoirs and changeover means for selectively changing at least between a first condition which permits an increase in the hydraulic pressure of the wheel cylinders of at least one of the hydraulic circuits by supplying the hydraulic braking pressure from the master cylinder via the first and second hydraulic circuits, and a second condition which permits a decrease in the hydraulic pressure of the wheel cylinders of at least one of the hydraulic circuits by allowing the hydraulic braking pressure to flow to the first and second reservoirs in response to the locking condition of the road wheels; and
a hydraulic pump for supplying hydraulic braking pressure from the first and second reservoirs to the first and second hydraulic circuits;
the hydraulic pump including;
a body;
an operational piston slidably fitted in a fluidtight manner within the body and defining a pressure chamber on one side thereof;
a piezo element disposed at a side of the operational piston opposite the pressure chamber, said piezo element expanding and contracting in response to the application of an oscillating voltage;
first and second pump mechanisms in communication with the first and second hydraulic circuits respectively and the first and second reservoirs respectively;
a changeover valve disposed between the pressure chamber and the first and second pump mechanisms, said changeover valve comprising a housing having a bore, a spool slidably fitted in the bore and defining two balance chambers which communicate with the first and second hydraulic circuits respectively, said spool being slidable in accordance with a pressure differential between the two balance chambers so that the pressure chamber is communicated with both or one of the first and second pump mechanisms;
said first and second pump mechanisms including:
a cylinder member;
a piston slidably disposed within the cylinder member for defining a pump chamber and an operation chamber;
an inlet check valve disposed between the pump chamber and one of the first and second reservoirs for permitting fluid communication from the respective reservoir to the pump chamber; and
an outlet check valve disposed between the pump chamber and one of the hydraulic circuits for permitting fluid communication from the pump chamber to the respective hydraulic circuit and for interrupting fluid communication from the respective circuit to the pump chamber.

6. The brake control device for vehicles as recited in claim 5, further comprising first biasing means for elastically biasing each of the pistons located in the cylinder members of the first and second pump mechanisms and second biasing means for elastically biasing the operational piston, said first biasing means being interposed in the pump chamber of each cylinder member and the second biasing means being interposed in the pressure chamber, and wherein an operational fluid is disposed between the pressure chamber and the operation chambers.

* * * * *